(12) United States Patent
Huntzicker et al.

(10) Patent No.: US 9,434,388 B2
(45) Date of Patent: Sep. 6, 2016

(54) SURFACE ESTIMATION FOR VEHICLES

(71) Applicant: GM GLOBAL TECHNOLOGY OPERATIONS LLC, Detroit, MI (US)

(72) Inventors: Fred W. Huntzicker, Ann Arbor, MI (US); Paul R. Williams, Northville, MI (US); Daniel R. Gee, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/530,255

(22) Filed: Oct. 31, 2014

(65) Prior Publication Data

US 2016/0121902 A1     May 5, 2016

(51) Int. Cl.
*B60W 40/068* (2012.01)
*B60W 40/06* (2012.01)
*B62D 6/00* (2006.01)

(52) U.S. Cl.
CPC ............ *B60W 40/068* (2013.01); *B60W 40/06* (2013.01); *B62D 6/00* (2013.01)

(58) Field of Classification Search
CPC ...... B60W 40/068; B60W 40/06; B62D 6/00
USPC .......................................................... 701/41
See application file for complete search history.

(56) References Cited

U.S. PATENT DOCUMENTS

| 2004/0263099 | A1* | 12/2004 | Maslov | B60L 11/126 318/400.24 |
| 2010/0131165 | A1* | 5/2010 | Salman | B60T 8/172 701/70 |
| 2011/0118935 | A1* | 5/2011 | Shiozawa | B60W 40/068 701/33.4 |
| 2011/0209521 | A1* | 9/2011 | Shiozawa | B60L 3/102 73/9 |
| 2012/0283944 | A1* | 11/2012 | Haavasoja | G01C 21/32 701/411 |
| 2015/0251658 | A1* | 9/2015 | Kato | B60L 3/102 701/22 |

FOREIGN PATENT DOCUMENTS

JP    WO 2014045365 A1 *  3/2014  .......... B60W 40/068

* cited by examiner

*Primary Examiner* — Aaron L Troost
(74) *Attorney, Agent, or Firm* — Lorenz & Kopf, LLP (57) ABSTRACT

Methods and systems are provided for estimating a characteristic of a surface of a road on which a vehicle is travelling is provided. The system comprises a sensor and a processor. The sensor is configured to measure information pertaining to a wheel slip for one or more wheels of the vehicle after a torque is applied. The processor is coupled to the sensor, and is configured to at least facilitate applying the torque for the one or more wheels of the vehicle, and estimating the characteristic of the surface of the road based at least in part on the wheel slip after the torque is applied and the torque.

20 Claims, 4 Drawing Sheets

SURFACE ESTIMATION FOR VEHICLES

TECHNICAL FIELD

The present disclosure generally relates to the field of vehicles and, more specifically, to methods and systems for estimating characteristics of surfaces of roads for vehicles.

BACKGROUND

Certain vehicles today utilize techniques for determining characteristics of a road on which the vehicle is travelling, such as a coefficient of friction for the road. Often such determinations are made during a braking or stability event. However, such techniques may not always be optimal in all situations. For example, in certain situations determinations of road characteristics may be desirable when a braking or stability event may not have occurred, for example in setting desired distances between vehicles in cruise control or non-cruise control driving.

Accordingly, it is desirable to provide improved methods and systems for estimating characteristics of surfaces of roads for vehicles. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for estimating a characteristic of a surface of a road on which a vehicle is travelling. The method comprises applying a torque for one or more wheels of the vehicle, determining a wheel slip for the one or more wheels, and estimating the characteristic of the surface of the road based at least in part on the wheel slip and the torque.

In accordance with another exemplary embodiment, a system for estimating a characteristic of a surface of a road on which a vehicle is travelling is provided. The system comprises one or more sensors and a processor. The sensor is configured to measure information pertaining to a wheel slip for one or more wheels of the vehicle after a torque is applied. The processor is coupled to the sensor, and is configured to at least facilitate applying the torque for the one or more wheels of the vehicle, and estimating the characteristic of the surface of the road based at least in part on the wheel slip after the torque is applied.

In accordance with another exemplary embodiment, a vehicle is provided. The vehicle comprises a plurality of wheels, a sensor, and a processor. The sensor is configured to measure information pertaining to a wheel slip for one or more of the plurality of wheels after a torque is applied. The processor is coupled to the sensor, and is configured to at least facilitate applying the torque for the one or more wheels, and estimating a characteristic of a surface of a road in which the vehicle is travelling based at least in part on the wheel slip after the torque is applied and the torque.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
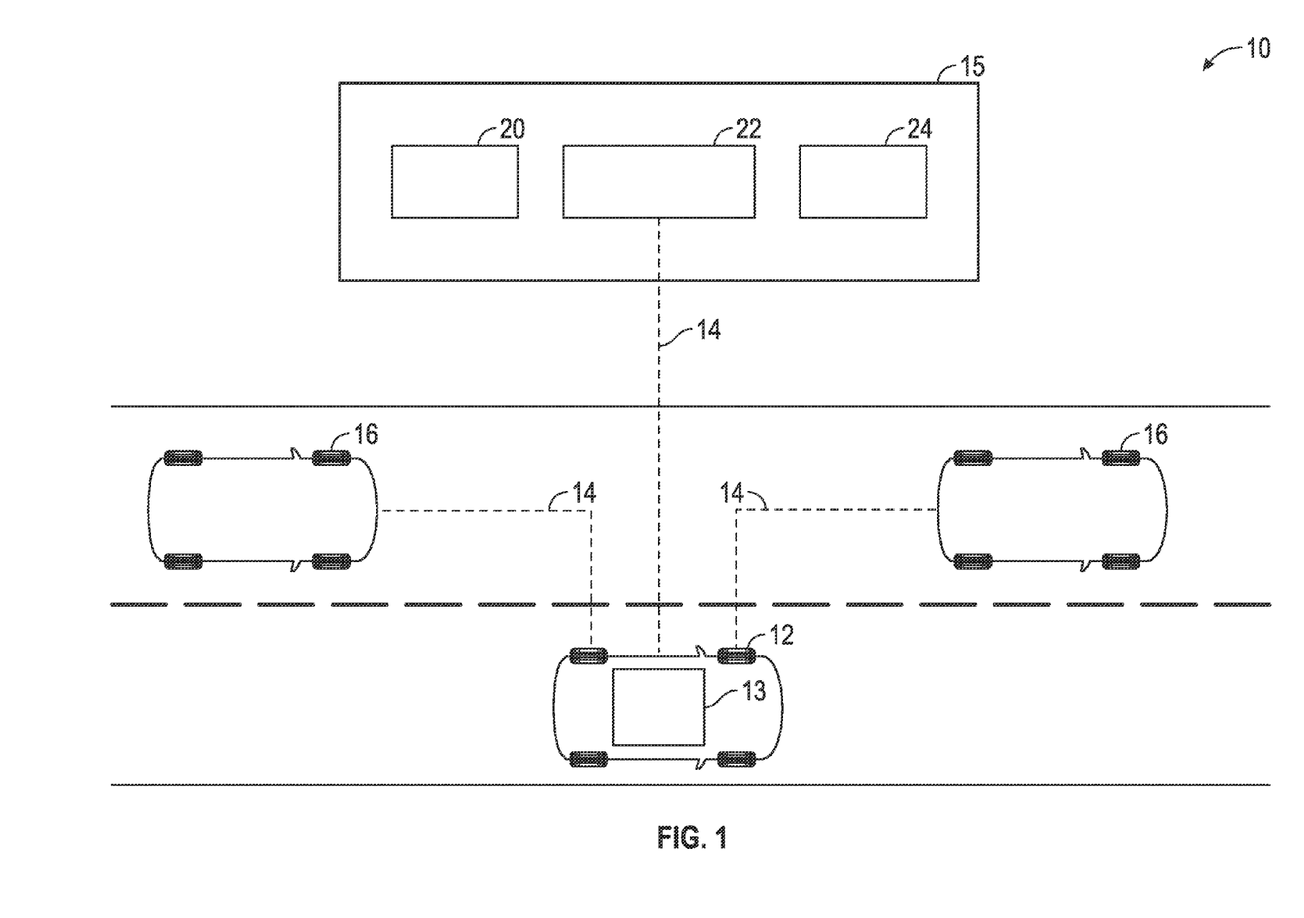
FIG. 1 is a functional block diagram of a system that includes a vehicle having a control system for determining characteristics of a surface of a road in which the vehicle is been driven, depicted along with other vehicles on or near the roadway, a remote server, and wireless networks coupling the vehicle, the other vehicles, and the remote server, in accordance with an exemplary embodiment.

FIG. 1 is a functional block diagram of a system 10 that includes a vehicle 12. As depicted in FIG. 1, the vehicle 12 includes a control system 13 that proactively determines characteristics of a surface of a road 11 in which the vehicle 12 is been driven, as described further below in connection with FIGS. 2-4. Also as depicted in FIG. 1, the vehicle 12 communicates via one or more wireless networks 14 with a remote server 15 and a plurality of other vehicles 16 on or near the road 11. In various embodiments, the wireless networks 14 may include one or more different types of wireless networks, such as one or more satellite networks, cellular networks, and/or vehicle to vehicle networks (e.g. using radio frequencies).

In one embodiment, the remote server 15 is disposed remote from the vehicle 12 and the other vehicles 16, and comprises a computer system having a processor 20, a communications system 22, and a memory 24. The processor 20 controls operation of the remote server 15 and the components thereof. The communications system 22 communicates with the vehicle 12 and the other vehicles 16, including with respect to information regarding the characteristics (including the coefficient of friction) of the road 11. In one embodiment, the processor 20, the communications system 22, and the memory 24 have features and functionality similar to the description of the processor 220, communications system 203, and memory 222, respectively, of the vehicle 12 as described further below in connection with FIG. 3. It will also be appreciated that, in certain embodiments, the other vehicles 16 of FIG. 1 may also have similar components, and/or a control system similar to the control system 13 of the vehicle 12 of FIG. 1.

Figure 2:
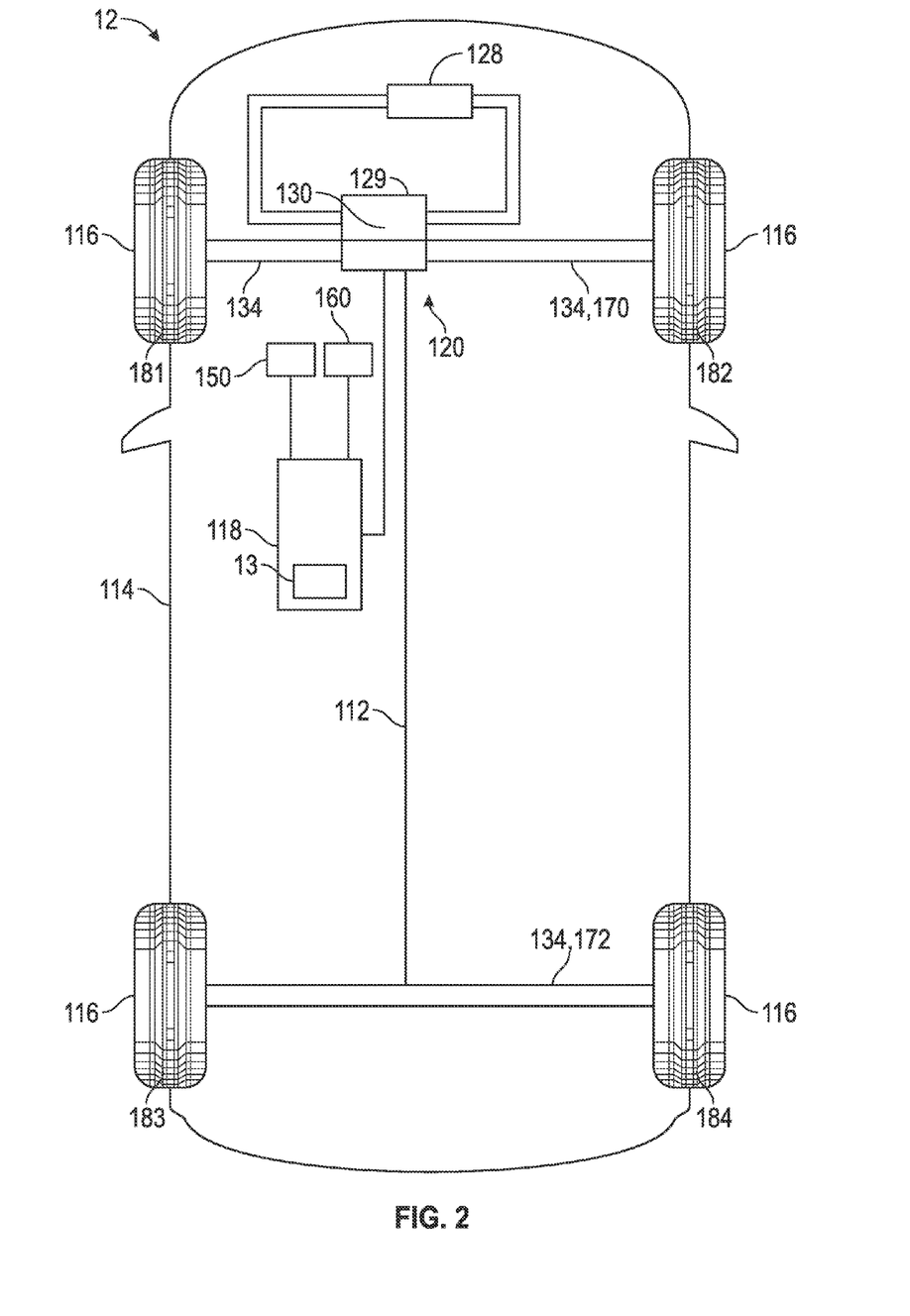
FIG. 2 is a functional block diagram of a vehicle that can be used in connection with the system of FIG. 1, in accordance with an exemplary embodiment.

FIG. 2 provides a functional block diagram of the vehicle 12 of FIG. 1, in accordance with an exemplary embodiment. As described in greater detail further below, the vehicle 12 includes a control system 13 that determines characteristics of a surface of a road 11 in which the vehicle 12 is being driven, in accordance with the steps of the process 400 described further below in connection with FIG. 4.

As depicted in FIG. 2, the vehicle 12 includes a chassis 112, a body 114, four wheels 116, an electronic control system 118, a steering system 150, a braking system 160, and the above-referenced control system 13. The body 114 is arranged on the chassis 112 and substantially encloses the other components of the vehicle 12. The body 114 and the chassis 112 may jointly form a frame. The wheels 116 are each rotationally coupled to the chassis 112 near a respective corner of the body 114. As depicted in FIG. 2, the wheels 116 include a front driver side wheel 181, a front passenger side wheel 182, a rear driver side wheel 183, and a rear passenger side wheel 184. It will be appreciated that the number of wheels 116 (including the number of front wheels 181, 182 and/or the number of rear wheels 183, 184) may vary in different embodiments.

The vehicle 12 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 12 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 2, the vehicle 12 includes an actuator assembly 120. In one such embodiment, the vehicle 12 may also include a radiator 128 as depicted in FIG. 2 (although this may vary in other embodiments). The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 2, the engine 130 is coupled to at least some of the wheels 116. In one embodiment this coupling is provided via one or more drive shafts 134, while in other embodiments the vehicle may be a direct drive vehicle. As depicted in FIG. 2, the drive shafts 134 include a front axle 170 and a rear axle 172.

In some embodiments, the engine 130 is mechanically coupled to the transmission. In other embodiments, the engine 130 may instead be coupled to a generator used to power an electric motor that is mechanically coupled to the transmission.

The steering system 150 is mounted on the chassis 112, and controls steering of the wheels 116. In one embodiment, the steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 12. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted).

The control system 13 is mounted on the chassis 112. The control system 13 determines characteristics of a surface of a road 11, in accordance with the steps of the process 400 described further below in connection with FIG. 4. In certain embodiments, the control system 13 may comprise all or part of, and/or may be coupled to, various other vehicle devices and systems, such as, among others, the braking system 160, the steering system 150, the actuator assembly 120, and/or the electronic control system 118. For example, in certain embodiments, the control system 13 may also control certain aspects of such systems, for example of the braking system 160, the steering system 150, and/or the actuator assembly 120.

Figure 3:
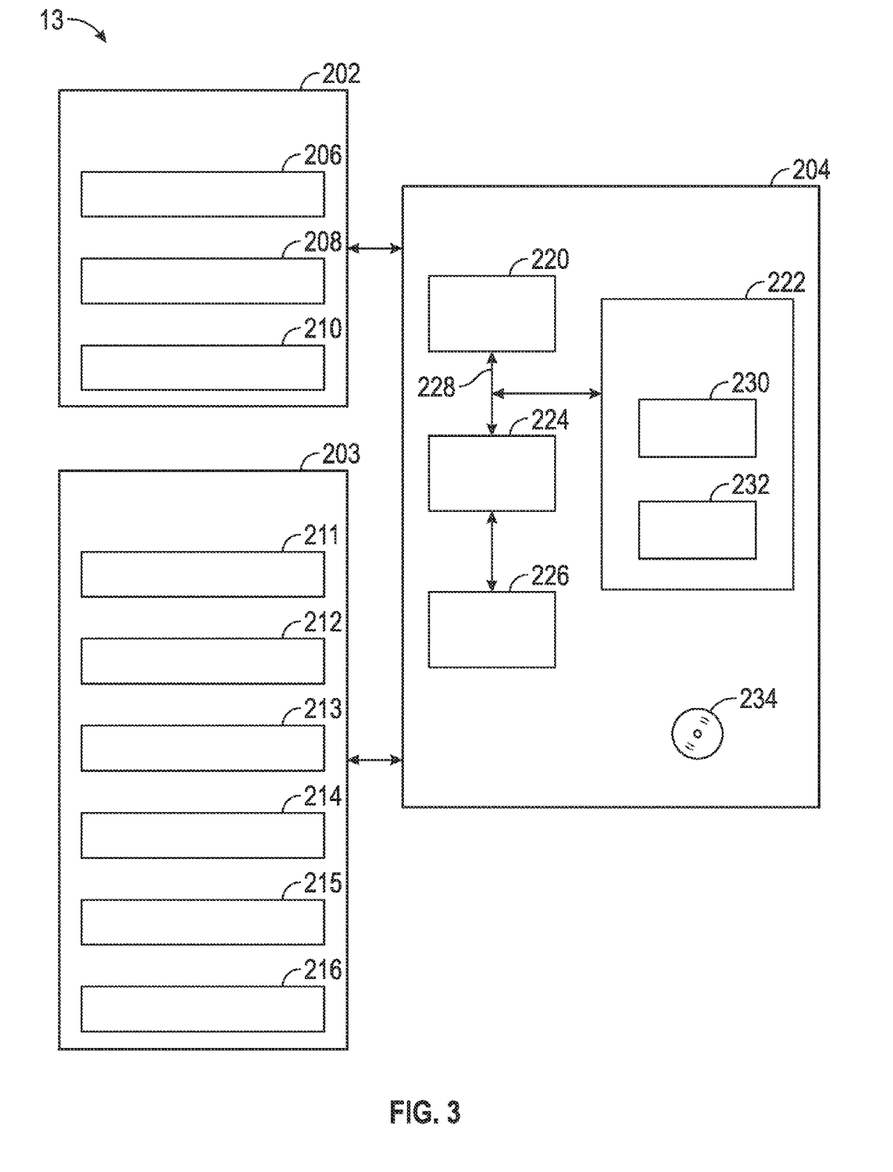
FIG. 3 is a functional block diagram of a control system that can be used in connection with the vehicle of FIGS. 1 and 2, in accordance with an exemplary embodiment.

FIG. 3 is a functional block diagram of the control system 13 of FIGS. 1 and 2, in accordance with an exemplary embodiment. As depicted in FIG. 3, the control system 13 includes a sensor array 202, a communications system 203, and a controller 204.

The sensor array 202 measures and obtains information for use by the controller 204 for determining characteristics of a surface of a road 11. In one embodiment, the sensor array 202 provides information as to wheel speeds of the various wheels 116 as well as a speed for the vehicle 12, for use in determining wheel slip. In one embodiment, each of the sensors in the sensor array 202 are disposed within a housing onboard the vehicle 12. As depicted in FIG. 3, in one embodiment, the sensor array 202 includes one or more wheel speed sensors 206 (preferably, one wheel speed sensor 206 for each wheel 116 of FIG. 1), vehicle speed sensors 208, and/or accelerometers 210. However, this may vary in other embodiments. The specific types and/or number of sensors in the sensor array 202 may vary in different embodiments.

The communications system 203 provides for communications for the vehicle 12, in communicating with the remote server 15 and the other vehicles 16 of FIG. 1. As depicted in FIG. 3, in one embodiment, the communications system 203 includes a communications interface 209 that facilitates communications between the vehicle 12 and the remote server 15 and other vehicles 16 of FIG. 1 using one or more wireless networks, such as the wireless networks 14 depicted in FIG. 1. In the depicted embodiment, the communications system 203 includes an antenna 211, a cellular chipset/component 212, a satellite chipset/component 213, a transceiver 214, a wireless modem 215, and a vehicle bus 216. The number and types of components of the communications system 203 and communications interface 209 may vary in other embodiments.

In one embodiment, the antenna 211 services various components of the communications interface 209, including the cellular chipset/component 212, the satellite chipset/component 213, and the transceiver 214. In one embodiment, a single antenna 211 comprises a multi-mode antenna servicing such various components. In other embodiments, multiple antennas 211 may be used.

Also in one embodiment, the cellular chipset/component 212 facilitates communications with one or more cellular networks using the antenna 211, and the satellite chipset/component 213 facilitates communications with one or more satellite networks using the antenna 211. The cellular chipset/component 212 and/or satellite chipset/component 213 may similarly be used to access the Internet (and/or other networks), for example using such cellular and/or satellite networks. Also in one embodiment, the transceiver 214 facilitates communications with other vehicles 16 of FIG. 1 using one or more vehicle to vehicle networks (for example, using radio frequencies).

In addition, in one embodiment, the wireless bus modem 215 facilitates data flow within the control system 13 (e.g., from and to the controller 204). Also in one embodiment, the vehicle bus 216 comprises a wired communication bus (e.g. a CAN bus) for communications with the controller 204 (e.g. between the sensor array 202 and the controller 204); however, this may vary in other embodiments (for example, as wireless networks may also be used).

In certain embodiments, the communications system 203 (and/or the control system 13 in general) may be part of and/or coupled to a telematics unit of the vehicle 12, for example that may be in communication with a call center and/or that may provide information and/or services such as, by way of example, turn-by-turn directions and other navigation-related services, airbag deployment notification and other emergency or roadside assistance-related services, infotainment-related services where music, Internet web pages, movies, television programs, videogames, and/or other content, and the like.

The controller 204 is coupled to the sensor array 202 and the communications system 203. In addition, in various embodiments, the controller 204 is also coupled to various other systems and/or components of the vehicle 12, including, by way of example, the wheels 116 and the braking system 160. The controller 204 determines characteristics of a surface of a road 11 of FIG. 1, in accordance with the steps of the process 400 described further below in connection with FIG. 4.

As depicted in FIG. 3, the controller 204 comprises a computer system. In certain embodiments, the controller 204 may also include one or more of the sensors of the sensor array 202 and/or one or more components of the communications system 203, among other possible vehicle components. In addition, it will be appreciated that the controller 204 may otherwise differ from the embodiment depicted in FIG. 3. For example, the controller 204 may be coupled to or may otherwise utilize one or more remote computer systems and/or other control systems.

In the depicted embodiment, the computer system of the controller 204 includes a processor 220, a memory 222, an interface 224, a storage device 226, and a bus 228. The processor 220 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 220 executes one or more programs 230 contained within the memory 222 and, as such, controls the general operation of the controller 204 and the computer system of the controller 204, preferably in executing the steps of the processes described herein, such as the steps of the process 400 (and any sub-processes thereof) in connection with FIG. 4.

The memory 222 can be any type of suitable memory. In various embodiments, this may include the various types of dynamic random access memory (DRAM) such as SDRAM, the various types of static RAM (SRAM), and the various types of non-volatile memory (PROM, EPROM, and flash). In certain examples, the memory 222 is located on and/or co-located on the same computer chip as the processor 220. In the depicted embodiment, the memory 222 stores the above-referenced program 230 along with one or more stored values 232 (e.g., equations, look-up tables, and/or threshold values) for use in implementing the steps of the process 400 (and any sub-processes thereof) of FIG. 4.

The bus 228 serves to transmit programs, data, status and other information or signals between the various components of the computer system of the controller 204. The interface 224 allows communication to the computer system of the controller 204, for example from a system driver and/or another computer system, and can be implemented using any suitable method and apparatus. It can include one or more network interfaces to communicate with other systems or components. The interface 224 may also include one or more network interfaces to communicate with technicians, and/or one or more storage interfaces to connect to storage apparatuses, such as the storage device 226.

The storage device 226 can be any suitable type of storage apparatus, including direct access storage devices such as hard disk drives, flash systems, floppy disk drives and optical disk drives. In one exemplary embodiment, the storage device 226 comprises a program product from which memory 222 can receive a program 230 that executes one or more embodiments of one or more processes of the present disclosure, such as the steps of the process 400 (and any sub-processes thereof) of FIG. 4, described further below. In another exemplary embodiment, the program product may be directly stored in and/or otherwise accessed by the memory 222 and/or a disk (e.g., disk 234), such as that referenced below.

The bus 228 can be any suitable physical or logical means of connecting computer systems and components. This includes, but is not limited to, direct hard-wired connections, fiber optics, infrared and wireless bus technologies. During operation, the program 230 is stored in the memory 222 and executed by the processor 220.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 220) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 3, for example in that the computer system of the controller 204 may be coupled to or may otherwise utilize one or more remote computer systems and/or other control systems.

Figure 4:
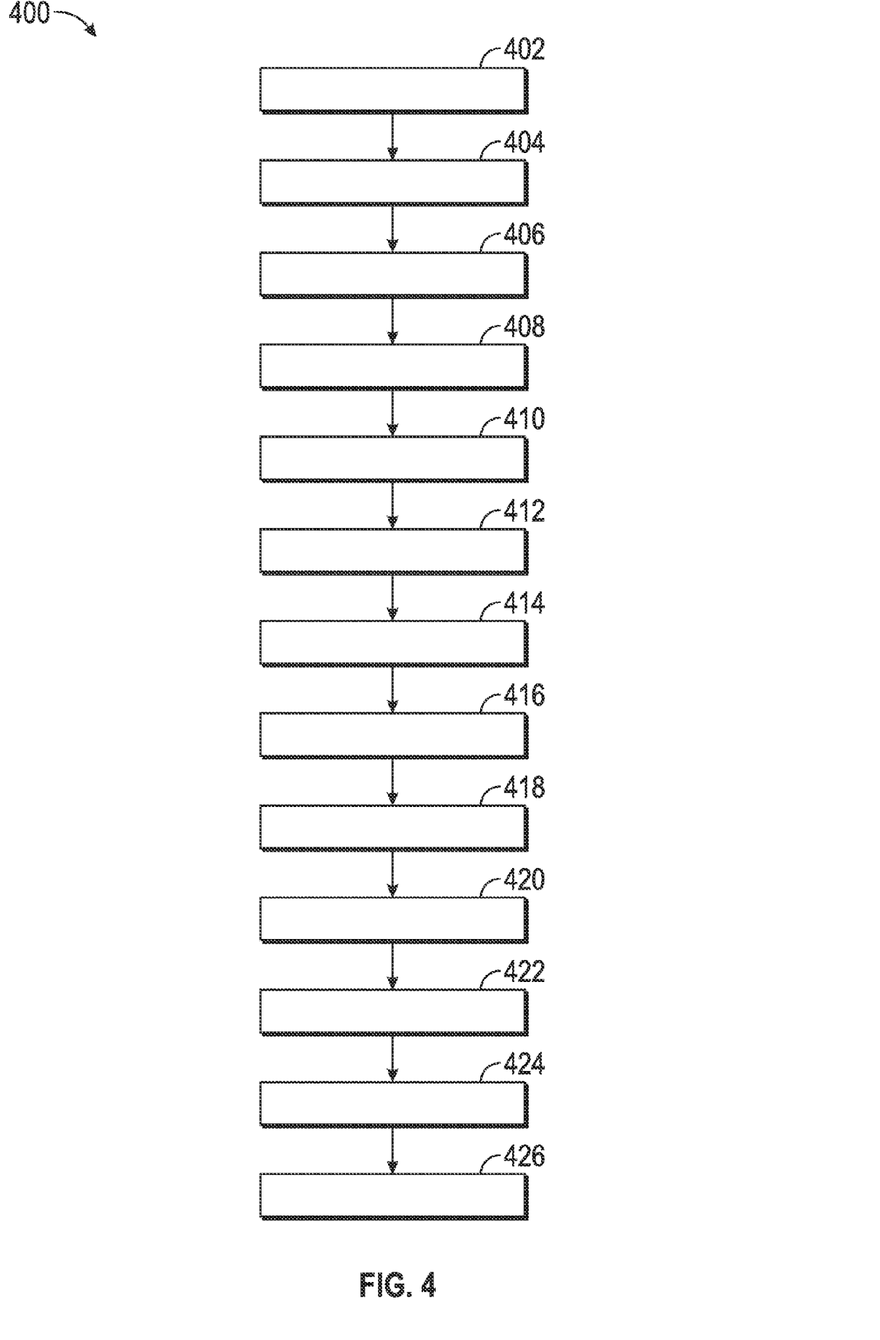
FIG. 4 is a flowchart of a process for determining characteristics of a surface of a road in which the vehicle is been driven, and that can be used in connection with the system of FIG. 1, the vehicle of FIGS. 1 and 2, and the control system of FIGS. 1-3, in accordance with an exemplary embodiment.

FIG. 4 is a flowchart of a process 400 for determining characteristics of a surface of a road in which a vehicle is travelling, in accordance with an exemplary embodiment. The process 400 can be implemented in connection with the system 10 of FIG. 1, the vehicle 12 of FIGS. 1 and 2, and the control system 13 of FIGS. 1-3, in accordance with an exemplary embodiment. In one embodiment, the various steps of the process 400 are performed continuously, and on a pro-active basis (e.g., before any automatic braking, stability, and/or emergency event has occurred) throughout an ignition cycle or vehicle drive for the vehicle 12.

As depicted in FIG. 4, the process 400 includes obtaining a location of the vehicle (step 402). In one embodiment, a geographic location (e.g. latitude/longitude values, a particular road and/or block or segment of the road, or the like)

is obtained for the vehicle 12 of FIGS. 1 and 2 via a global position system (GPS) device, such as via the communications system 203 of FIG. 3.

Wheel speed values are determined (step 404). In one embodiment, wheel speeds are determined for each of the wheels 116 of FIG. 2. In one embodiment, the wheel speeds are measured by the respective wheel speed sensors 206 of FIG. 3 for each wheel 116 and provided to the processor 220 of FIG. 3.

A vehicle speed is determined (step 406). In one embodiment, the vehicle speed is calculated via the processor 220 of FIG. 3 based on an aggregation of the wheel speeds of step 404. In other embodiments, the vehicle speed may be determined and/or measured using data from one or more vehicle speed sensors 208 and/or accelerometers 210 of FIG. 3 (e.g. as direct measurements and/or via calculations performed by the processor 220 of FIG. 3), among other possible techniques.

Wheel slip values are determined (step 408). In one embodiment, the wheel slip values are determined for each of the wheels 116 of FIG. 2 by the processor 220 of FIG. 3 using the wheel speed values of step 404 and the vehicle speed value of step 406, for example by comparing each wheel slip value individually with the vehicle speed value. In one embodiment, wheel slip is calculated as a percentage by means of calculating a difference between wheel speed (e.g., an average speed) and vehicle speed and dividing this difference by the vehicle speed, as follows:

$$\text{Wheel Slip} = (\text{Wheel Speed} - \text{Vehicle Speed})/\text{Vehicle Speed} \quad \text{(Equation 1)}$$

Torque is applied (or introduced, or subtracted) to one or more of the wheels 116 (step 410). In one embodiment, the processor 220 of FIG. 3 provides instructions for torque to be provided to one or more wheels 116 but not others, and/or in different amounts to different wheels 116, to create a small torque imbalance. In one exemplary embodiment, approximately 10 NM of torque would be used; however, this may vary in other embodiments. Also in one embodiment, the torque is provided to different wheels 116 in different amounts such that a total net torque about a center of the vehicle 12 from the applied torque is equal to zero. Accordingly, in one embodiment, there is no net change in direction or speed of the vehicle 12 as a whole as a result of the applied torque, and there would be no appreciable feeling of any effects of the applied torque by the driver.

In one such embodiment, different amounts of torque are applied to different respective wheels 116 of the vehicle 12 in a matter that is balanced diagonally across the vehicle 12. For example, in one such embodiment (e.g., in an electric vehicle having four wheel motor control), the diagonal balance may achieved by providing (i) a relatively greater first amount of torque on both the driver side front wheel 181 and the passenger side rear wheel 184 of FIG. 2 and (ii) a relatively lesser second amount of torque on both the passenger side front wheel 182 and the driver side rear wheel 183 (or vice versa).

In another embodiment, the torque may be balanced in a similar manner by applying different amounts of torque to different respective wheels of the vehicle via torque vectoring, specifically, through a torque vectoring differential.

In yet another embodiment, a small amount of brake drag is applied on a front wheel 181 or 182, and a compensating amount of positive torque is provided to one of the rear wheels 183, 184 that is disposed directly behind the front wheel 181, 182 to which the brake draft was applied (for example, if the brake drag is applied to the passenger side front wheel 182, then the compensating positive torque would be applied to the passenger side rear wheel 184). In one embodiment, the magnitude of the brake drag is equal to the magnitude of the compensating positive torque. By way of further clarification, in one embodiment there would not physically be torque added to the other wheel, other than what might be transferred through the differential.

In yet another embodiment, a torque is applied to one of the wheels 116, and the torque is compensated for by providing a steering angle adjustment via instructions provided by the processor 220 of FIG. 3 that compensates for the applied torque (e.g. in a vehicle with steering by wire functionality). For example, in one such embodiment, the processor 220 of FIG. 3 determines an angle of rotation for the vehicle 12 that would otherwise be caused by the applied torque on one of the wheels 12, and the processor 220 provides instructions for the steering wheel adjustment in an amount that equals and/or balances the rotation (i.e., so that the net rotation of the vehicle 12 is zero). In one embodiment, the steering angle may be expressed or considered as applying a lateral force, such that the induced vehicle moment will counter the moment applied by the wheel torque.

In certain embodiments, the applied torque of step 410 is modified over time. In one such embodiment, the applied torque is modified in a sinusoidal manner via instructions provided by the processor 220, for example in order to receive different values over time that help to reduce any noise. Applicant notes that a sinusoid is just one example in accordance with one exemplary embodiment. In other exemplary embodiments, a triangle, a saw tooth, and/or one or more other manners may also be used. In addition, by comparing the input torque and analyzing the calculated slip, and performing a regression, some noise in the data could be eliminated.

Updated wheel slip values are determined (step 412). In one embodiment, the wheel slip values are determined in step 412 using the same technique(s) of step 408, but are conducted after the torque has been applied in step 410. Wheel slip differences are then calculated in step 414 (e.g. by subtracting the wheel slip values of step 408 from the updated wheel slip values of step 412), to determine the changes in wheel (e.g., the slope of the wheel slip) that are attributable to the applied torque of step 410. In one embodiment, these determinations are made by the processor 220 of FIG. 3.

The characteristic of the road is determined (step 416). In one embodiment, a coefficient of friction for the surface of the road is determined using the slip difference values (e.g. slope) of step 412 and the magnitude of the torque applied in step 410. In one embodiment, the slip difference values and the torque are compared with known values of road surface coefficients of friction for various combinations of torque and wheel slip slope values, for example using one or more equations and/or look-up tables that are stored in the memory 222 of FIG. 3 as stored values 232 thereof.

In one embodiment, information as to road surface characteristic is transmitted by the vehicle 12 (step 418). In one embodiment, the coefficient of friction is transmitted via the communications system 203 of FIG. 3 via one or more wireless networks 14 of FIG. 1 to the remote server 15 and/or other vehicles 16 of FIG. 1. The information may then be stored in the memory 24 of the remote server 15 and/or utilized by the other vehicles 16 in implementing one or more vehicle actions and/or controls (step 420).

In one embodiment, information as to road surface characteristic is received from the vehicle 12 (step 422). In one embodiment, the vehicle 12 receives road surface coefficient information from other vehicles 16 of FIG. 1 that are being driven or recently have been driven on the same road 11 as the vehicle 12 or a nearby road. Also in one embodiment, this information may be received directly by the vehicle 12 via the communications system 203 of FIG. 3 and the wireless network(s) 14 of FIG. 1. In another embodiment, such information may be received by the vehicle 12 via the communications system 203 of FIG. 3 and the wireless network(s) 14 of FIG. 1 from the remote server 15 of FIG. 1 (which, for example, may have recently received such information from the other vehicles 16 of FIG. 1 and stored the information in the memory 24 of FIG. 1). This may be done, for example, to share the responsibility among the vehicles for applying the torque imbalances and calculating the road surface characteristics, for example to provide improved accuracy and redundancy and to further limit any possible inconvenience to the drivers of the vehicles.

In one embodiment, the values obtained from the other vehicles 16 (directly or indirectly) in step 422 is combined with the information determined by the vehicle 12 in step 416 (step 424). In one example, the coefficient values are averaged (for example, using an arithmetic mean) by the processor 220 of FIG. 3; however, this may vary in other embodiments.

The characteristic of the road surface (e.g. the coefficient of friction) is then implemented (step 426). In various embodiments the coefficient of friction is used as an input into various vehicle control algorithms, including, by way of example, for antilock braking systems, active safety, stability control, path planning, cruise control, and for the adjusting of trailer brake gain in trailer/truck examples, among other possible systems and features. In one embodiment, the implementation is performed by the processor 220 of FIG. 3.

Accordingly, methods and systems are provided for determining characteristics of a surface of a road on which a vehicle is travelling. As discussed above, minor torque imbalances are applied, and resulting slip differences are used to estimate a coefficient of friction for the road. Also in certain embodiments, data may also be incorporated from other vehicles that have recently travelling on or near the same roadway. The disclosed methods and systems allow for the coefficient of the road surface to be estimated proactively, and in situations in which estimates may otherwise be difficult, for example during cruise control and/or otherwise in which an appropriate distance between vehicles is desired, among other possible implementations.

It will be appreciated that the system 10 of FIG. 1 and/or the vehicle 12 and/or control system 13 of FIGS. 1-3, and/or components thereof, may vary in different embodiments. It will also be appreciated that various steps of the process 400 and any sub-processes described herein in connection with FIG. 4 may vary in certain embodiments. It will similarly be appreciated that various steps of the process 400 and any sub-processes described herein in connection with FIG. 4 may occur simultaneous with one another, and/or in a different order as presented in FIG. 4 and/or as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for estimating a characteristic of a surface of a road on which a vehicle is travelling, the method comprising;
    applying a torque of a particular magnitude for one or more wheels of the vehicle;
    determining a first wheel slip for the one or more wheels prior to applying the torque;
    determining a second wheel slip for the one or more wheels subsequent to applying the torque;
    determining a wheel slip difference between the second wheel slip and the first wheel slip; and
    estimating the characteristic of the surface of the road based at least in part on the wheel slip difference and the magnitude of the applied torque.

2. The method of claim 1, wherein the step of applying the torque comprises applying different amounts of torque to different respective wheels of the vehicle so that a total net torque about a center of the vehicle from the applied torque is equal to zero.

3. The method of claim 1, wherein the step of applying the torque comprises applying different amounts of torque to different respective wheels of the vehicle in a matter that is balanced diagonally across the vehicle.

4. The method of claim 1, wherein the step of applying the torque comprises applying different amounts of torque to different respective wheels of the vehicle via torque vectoring.

5. The method of claim 1, wherein the step of applying the torque comprises applying a brake drag on a first of the wheels of the vehicle and applying a compensating positive torque on a second of the wheels of the vehicle.

6. The method of claim 1, further comprising:
    modifying the applied torque in a sinusoidal manner with a modified magnitude;
    determining an updated wheel slip difference based on the modification of the applied torque in the sinusoidal manner; and
    estimating an updated characteristic of the surface of the road based at least in part on the updated wheel slip difference and the modified magnitude of the torque applied in the sinusoidal manner.

7. The method of claim 1, further comprising:
    providing a steering angle adjustment that compensates for the applied torque.

8. The method of claim 1, further comprising:
    receiving information from one or more remote sources as to the characteristic of the surface; and
    updating the estimated characteristic of the surface using the received information.

9. The method of claim 1, further comprising:
    transmitting, via a transmitter, the estimated characteristic of the surface for use on one or more other vehicles.

10. The method of claim 9, further comprising:
    receiving, via a receiver, a different value of the characteristic of the surface from one or more other vehicles; and
    updating, via the processor, the estimated characteristic of the surface using the different value that was received from the one or more other vehicles.

11. The method of claim 10, wherein the step of updating the estimated characteristic comprises:
averaging the estimated characteristic of the surface as generated by the processor with the different value of the characteristic as received via the receiver, to thereby generate the updated estimate of the characteristic of the surface.

12. A system for estimating a characteristic of a surface of a road on which a vehicle is travelling, the system comprising:
a sensor configured to measure information pertaining to a first wheel slip for one or more wheels of the vehicle before a torque of a particular magnitude is applied and a second wheel slip for the one or more wheels after the torque is applied; and
a processor coupled to the sensor and configured to at least facilitate:
applying the torque for the one or more wheels of the vehicle;
determining a wheel slip difference between the second wheel slip and the first wheel slip; and
estimating the characteristic of the surface of the road based at least in part on the wheel slip difference and the magnitude of the applied torque.

13. The system of claim 12, wherein the processor is configured to at least facilitate:
applying different amounts of torque to different respective wheels of the vehicle so that a total net torque about a center of the vehicle from the applied torque is equal to zero;
determining the wheel slip difference based on respective wheel slips before and after the application of different amounts of torque are applied in the manner so that the total net torque about the center of the vehicle from the applied torque is equal to zero; and
estimating the characteristic of the surface based at least in part on the wheel slip difference from the application of different amounts of torque are applied in the manner so that the total net torque about the center of the vehicle from the applied torque is equal to zero.

14. The system of claim 12, wherein the processor is configured to at least facilitate:
applying different amounts of torque to different respective wheels of the vehicle in a matter that is balanced diagonally across the vehicle;
determining the wheel slip difference based on respective wheel slips before and after the different amounts of torque are applied in the manner that is balanced diagonally across the vehicle; and
estimating the characteristic of the surface based at least in part on the wheel slip difference from the application of the different amounts of torque applied in the manner that is diagonally balanced across the vehicle.

15. The system of claim 12, wherein the processor is configured to at least facilitate:
applying different amounts of torque to different respective wheels of the vehicle via torque vectoring;
determining the wheel slip difference based on respective wheel slips before and after the different amounts of torque are applied via the torque vectoring; and
estimating the characteristic of the surface based at least in part on the wheel slip difference from the application of the different amounts of torque applied via the torque vectoring.

16. The system of claim 12, wherein the processor is configured to at least facilitate:
applying a brake drag on a first of the wheels of the vehicle and applying a compensating positive torque on a second of the wheels of the vehicle;
determining the wheel slip difference based on respective wheel slips before and after the applying of the brake drag; and
estimating the characteristic of the surface based at least in part on the applying of the brake drag.

17. The system of claim 12, wherein the processor is configured to at least facilitate:
modifying the applied torque in a sinusoidal manner;
determining an updated wheel slip difference based on the modification of the applied torque in the sinusoidal manner; and
estimating an updated characteristic of the surface of the road based at least in part on the updated wheel slip difference and the modified magnitude of the torque applied in the sinusoidal manner.

18. The system of claim 12, wherein the processor is configured to at least facilitate providing a steering angle adjustment that compensates for the applied torque.

19. The system of claim 12, further comprising:
a receiver configured to at least facilitate receiving information from one or more remote sources as to the characteristic of the surface;
wherein the processor is further configured to at least facilitate updating the estimated characteristic of the surface using the received information.

20. A vehicle comprising:
a plurality of wheels;
a sensor configured to measure information pertaining to a first wheel slip for one or more of the plurality of wheels before a torque of a particular magnitude is applied and a second wheel slip for the one or more wheels after a torque is applied; and
a processor coupled to the sensor and configured to at least facilitate:
applying the torque for the one or more wheels;
determining a wheel slip difference between the second wheel slip and the first wheel slip; and
estimating a characteristic of a surface of a road in which the vehicle is travelling based at least in part on the wheel slip difference and the magnitude of the applied torque.

* * * * *